(12) United States Patent
Tanaka

(10) Patent No.: US 6,905,640 B2
(45) Date of Patent: Jun. 14, 2005

(54) METHOD OF ALIGNING LIQUID CRYSTAL COMPOUNDS

(75) Inventor: Kouichi Tanaka, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 53 days.

(21) Appl. No.: 10/258,260

(22) PCT Filed: Apr. 23, 2001

(86) PCT No.: PCT/JP01/03456
§ 371 (c)(1), (2), (4) Date: Dec. 9, 2002

(87) PCT Pub. No.: WO01/81958
PCT Pub. Date: Nov. 1, 2001

(65) Prior Publication Data
US 2003/0113483 A1 Jun. 19, 2003

(30) Foreign Application Priority Data
Apr. 24, 2000 (JP) ......................... 2000-122178
Apr. 24, 2000 (JP) ......................... 2000-122631

(51) Int. Cl.⁷ ............................. B29D 11/00
(52) U.S. Cl. ...................... 264/1.34; 264/1.38; 264/1.7; 264/2.6; 264/2.7; 349/124; 428/1.2
(58) Field of Search .................. 264/1.34, 1.1, 264/2.7, 2.6, 1.38, 1.7; 428/1.1, 1.2, 1; 349/123, 124

(56) References Cited
U.S. PATENT DOCUMENTS
5,061,042 A   10/1991  Nakamura et al. .......... 349/102
5,631,051 A    5/1997  Ito ............................... 428/1

FOREIGN PATENT DOCUMENTS

| | | |
|---|---|---|
| DD | DD 266858 | 4/1989 |
| EP | 0 297 841 | 1/1989 |
| EP | 0 573 278 | 12/1993 |
| EP | 0 926 534 | 6/1999 |
| JP | 63-088522 | 4/1988 |
| JP | 03-009325 | 1/1991 |
| JP | 04-016919 | 1/1992 |
| JP | 08-146220 | 11/1994 |
| JP | 08-278491 | 10/1996 |
| JP | 09-179125 | 7/1997 |
| JP | 10-319408 | 12/1998 |
| JP | 10-332933 | 12/1998 |
| JP | 11-349947 | 12/1999 |
| JP | 2000-284286 | 10/2000 |

OTHER PUBLICATIONS

Copy of the International Search Report dated Jul. 24, 2001.

Primary Examiner—Mathieu D. Vargot
(74) Attorney, Agent, or Firm—Nields & Lemack

(57) ABSTRACT

A method of aligning a liquid crystal compound comprising a stretching treatment or rubbing treatment which allows the liquid crystal compound to be aligned in a direction different from the stretching direction or the rubbing direction is provided.

A method of aligning a liquid crystal compound characterized in that the method comprises subjecting a polymeric film having hydroxyl groups to a) a stretching treatment and an esterifying treatment, or b) an esterifying treatment followed by a rubbing treatment; and then forming a layer of the liquid crystal compound on the film, so that the liquid crystal compound is aligned in a direction different from the stretching direction in case of a), or the liquid crystal compound is aligned in a direction almost perpendicular to the surface of the rubbed film in case of b).

8 Claims, 8 Drawing Sheets

METHOD OF ALIGNING LIQUID CRYSTAL COMPOUNDS

FIELD OF THE INVENTION

The present invention relates to a method of aligning a liquid crystal compound and an optical film obtained by the method. More particularly, it relates to a method of preparing a highly aligned liquid crystal compound having a function of controlling a light and suitable for use in fields including optical electronics and the like, and an optical film obtained by the method.

BACKGROUND OF THE INVENTION

When a liquid crystal compound is used as an element for controlling a light, generally the liquid crystal compound should be arranged (aligned) in a certain direction. However, such a molecular alignment may be varied with external factors including an electric field, a magnetic field, a shear force, an interface and the like. And, a light controlling function originating from a change in the alignment has been used to improve the properties of a liquid crystal display such as a viewing angle, a contrast, a color change and the like. Known methods of aligning a liquid crystal compound in a certain direction include a method comprising forming a layer of a liquid crystal compound on an orientated polymeric film to align the liquid crystal compound in the stretching direction of the polymeric film (Japanese Patent No. 2631015, JP-A-04-16919) and a method comprising subjecting an alignment layer of, for example, polyimide to a rubbing treatment to align the liquid crystal compound in the rubbing direction.

SUMMARY OF THE INVENTION

However, the method of aligning a liquid crystal compound using an orientated polymeric film could not align the liquid crystal compound in directions other than the stretching direction. Further, the method of aligning a liquid crystal compound using a rubbing treatment could not align the liquid crystal compound in directions other than the rubbing direction (or the direction orthogonal to the rubbing direction within the surface of the alignment layer) in many cases.

An object of the present invention is to provide a method of aligning a liquid crystal compound comprising a stretching treatment or a rubbing treatment as set forth above wherein the method can align the liquid crystal compound in a direction different from the stretching direction or the rubbing direction. That is, the present invention relates to:

(1) a method of aligning a liquid crystal compound characterized in that the method comprises
 subjecting a polymeric film having hydroxyl groups to a) a stretching treatment and an esterifying treatment, or b) an esterifying treatment followed by a rubbing treatment; and then
 forming a layer of the liquid crystal compound on the film,
so that the liquid crystal compound is aligned in a direction different from the stretching direction in case of a), or the liquid crystal compound is aligned in a direction almost perpendicular to the surface of the rubbed film in case of b);

(2) the method of aligning a liquid crystal compound as described in the item (1) wherein when the polymeric film having hydroxyl groups is subjected to a stretching treatment and an esterifying treatment, the liquid crystal compound of the layer is aligned in a direction almost perpendicular to the surface of the film;

(3) the method of aligning a liquid crystal compound as described in the item (1) or (2) wherein the esterifying treatment is carried out with a boric acid compound;

(4) the method of aligning a liquid crystal compound as described in the item (3) wherein the boric acid compound is ortho-boric acid;

(5) the method of aligning a liquid crystal compound as described in any one of the items (1) to (4) wherein the polymeric film having hydroxyl groups is a film of polyvinyl alcohol or its derivative;

(6) the method of aligning a liquid crystal compound as described in any one of the items (1) to (5) wherein the polymeric film subjected to a stretching treatment and an esterifying treatment has a polarization property;

(7) the method of aligning a liquid crystal compound as described in any one of the items (1) to (6) wherein the method of forming the layer of the liquid crystal compound is a method comprising applying a solution of the compound onto a) a polymeric film subjected to a stretching treatment and an esterifying treatment or b) a polymeric film subjected to an esterifying treatment followed by a rubbing treatment, and then drying the coated film;

(8) the method of aligning a liquid crystal compound as described in any one of the items (1) to (7) wherein the liquid crystal compound is a thermotropic liquid crystal or a lyotropic liquid crystal;

(9) the method of aligning a liquid crystal compound as described in the item (8) wherein the liquid crystal compound is a compound appearing a nematic phase in a liquid crystal state;

(10) the method of aligning a liquid crystal compound as described in any one of the items (1) to (9) wherein the liquid crystal compound is a UV curable or thermosetting liquid crystal compound;

(11) an optical film having a layer of the liquid crystal compound obtained by the method as described in any one of the items (1) to (10);

(12) the optical film as described in the item (11), having the polymeric film obtained by the method as described in any one of the items (1) to (10);

(13) an image display device having the optical film as described in the item (11) or (12);

(14) the image display device as described in the item (13) which is a liquid crystal display device.

DETAILED DESCRIPTION OF THE INVENTION

A polymeric film to be used in the present invention is a film which has hydroxyl groups, can be subjected to an esterifying treatment, and can be subjected to a stretching or rubbing treatment. The polymeric film may be a film comprising polyvinyl alcohol, its derivative or the like. Examples of the film comprising a derivative of polyvinyl alcohol include a film comprising a polymeric compound obtained by partially modifying polyvinyl alcohol with an alkyl; a film comprising a polymeric compound obtained by varying the degree of hydrolysis (degree of saponification) of polyvinyl acetate; a film comprising a polymeric compound obtained by dehydrating polyvinyl alcohol by a reaction with an acid so as to partially form a polyene structure; and the like. Although the polymerization degree of these polymeric films may be varied with the nature of a polymer used and the easiness in the formation of a film, it is, for example, preferably about 500 to 5,000, more preferably about 1,000 to 4,000 when the polymeric film is a polyvinyl alcohol film. Although the draw ratio, when the polymeric film is stretched, may be varied with the nature of a material constituting the polymeric film, it is, for example, preferably about 1.5 to 7 times, more preferably about 2 to 6 times when the polymeric film is a polyvinyl alcohol film. The stretching is preferably a monoaxial or biaxial stretching, with the monoaxial stretching being more preferred. The thickness of the polymeric film is not particularly limited, but it is preferably about 0.05 to 1,000 μm, more preferably about 0.05 to 500 μm. When the polymeric film is to be subjected to a stretching treatment and an esterifying treatment, the thickness of the polymeric film after the stretching treatment is preferably about 5 to 500 μm, more preferably about 5 to 100 μm and most preferably about 10 to 50 μm. On the other hand, when the polymeric film is to be subjected to an esterifying treatment followed by a rubbing treatment, the thickness of the polymeric film is preferably about 0.05 to 50 μm, more preferably about 0.05 to 10 μm and most preferably about 0.05 to 5 μm. The terms "film" and "membrane" as used herein have the substantially same meaning. However, it is possible to distinguish both terms by referring a relatively thick material to "a film" and a relatively thin material to "a membrane".

Contacting the liquid crystal compound with a surface of the polymeric film used will suffice for the purpose of the present invention. However, a glass plate or any other plastic film may be laminated on a surface of the polymeric film opposite to the surface contacting with the liquid crystal compound in order to impart a sufficient mechanical strength to the polymeric film such that the liquid crystal compound is stably aligned. The plastic film includes, but is not limited to, polyethylene terephthalate film, polyarylate film, polyethylene naphthalate film, polybutylene terephthalate film, polyether ether ketone film, polyethylene film, polypropylene film, polycarbonate film, polystyrene film, polyvinylidene chloride film, acetyl cellulose film, triacetylcellulose film and the like. Further, these plastic films may be a monoaxially or biaxially stretched film. The laminating method includes, for example, a method comprising adhering them with various pressure-sensitive adhesives or adhesives; and a method comprising preparing a solution of the polymeric compound having hydroxyl groups, applying the solution onto the glass plate or the plastic film and then heating and drying the grass plate or the plastic film to remove the solvent. The method of applying the solution includes, for example, a microgravure coating method, a gravure coating method, a wire bar coating method, a dip coating method, a spray coating method, a meniscus coating method.

A polymeric film used in the present invention may be a film having a polarization property. A polarization property can be imparted to the polymeric film by a method comprising adsorbing a dichromatic colorant such as a dichromatic dye or an iodine complex into a monoaxially orientated polyvinyl alcohol film or its derivative; or a method comprising dehydrating a monoaxially orientated polyvinyl alcohol film with an acid to partially form a polyene structure.

The esterifying treatment according to the present invention means a treatment comprising forming an ester by a reaction of the hydroxyl group of the polymeric film. Examples of the esterifying treatment include an boric ester-forming treatment using a boric acid compound; a chelating treatment using a titanium compound; a (hemi) acetalizing treatment using an aldehyde or ketone compound; and an alkoxysilylating treatment using an alkoxysilane compound. Specifically, when a polyvinyl alcohol film is used, the esterifying treatment corresponds to, for example, the so-called gelation reaction described in "Povals" written by Koichi NAGANO, Saburo YAMANE and Kentaro TOYOSHIMA, ed. by Kobunshi Kanko-kai. More specifically, the esterifying treatment may be a treatment of an orientated polyvinyl alcohol film with ortho-boric acid ($H_3BO_3$); a treatment of a polyvinyl alcohol film with ortho-boric acid ($H_3BO_3$) prior to a rubbing treatment; or the like.

Conditions under which the esterifying treatment is conducted and the esterification degree, which may be varied with a polymeric film having hydroxyl groups to be used, are suitably determined. In case of the esterifying treatment of a polyvinyl alcohol film with ortho-boric acid, it is preferred to conduct the esterifying treatment such that the esterified film contains about 2% or more, preferably about 5 to 40%, more preferably about 10 to 30% of boric acid. Examples of the specific treatment, when a polyvinyl alcohol film is used, include a method comprising swelling the film in a hot water at about 30 to 40° C., optionally adsorbing a dichromatic dye or an iodine complex for imparting a polarization property to the film, and then immersing the film in a hot aqueous boric acid solution at about 30 to 50° C. for a predetermined period while stretching the film; a method comprising stretching the film and then immersing it in a hot aqueous boric acid solution for a predetermined period; and a method comprising stretching the film with heating and then treating it in a hot aqueous boric acid solution. And, when a laminated film prepared by applying an aqueous polyvinyl alcohol solution onto a plastic film and then heating and drying the film to remove the solvent is used, examples of the treatment include a method comprising applying an aqueous boric acid solution onto the polyvinyl alcohol layer laminated on the plastic film followed by heating and drying treatment; and a method comprising immersing a plastic film comprising a polyvynil alcohol layer formed on the film in a hot aqueous boric acid solution at about 30 to 50° C. for a predetermined period followed by heating and drying treatment.

The rubbing treatment according to the present invention means a method for treating a surface of an esterified polymeric film, comprising preparing a rubbing roll by adhering to the roll a velvet-like cloth in which fibers such as rayon, nylon, cotton or aramide fibers are fixed, contacting the rubbing roll with the esterified polymeric film while rotating the roll at a high speed, and then unidirectionally moving the rubbing roll. Alternatively, a continuous rubbing treatment is also possible by rotating a steady rubbing roll at a high speed and conveying an esterified polymeric film while contacting it with the rubbing roll. Conditions under which the rubbing treatment is to be conducted may be suitably determined depending on variables including the nature of the polymeric film to be used, the nature of the plastic film to be laminated, the nature of the cloth, the diameter of the rubbing roll, the number of revolution and rotating direction of the roll, the conveying speed of the polymeric film or the rubbing roll, the degree of pressing the rubbing roll against the polymeric film, and the like.

The liquid crystal compound to be used according to the present invention may be a thermotropic liquid crystal compound showing a liquid crystal property within a certain temperature range, a lyotropic liquid crystal compound showing a liquid crystal property in a solution containing the compound within a certain concentration range, or the like. Particularly, when a thermotropic liquid crystal compound is used, it is often used as a mixture of plural thermotropic liquid crystal compounds in order that a liquid crystal property can be shown in a wide temperature range. The liquid crystal compound may be a low molecular weight compound, a high molecular weight compound or a mixture thereof, and preferably shows a nematic phase as the liquid crystalline phase. Further, for fixing the aligned state, the liquid crystal compound is preferably a compound capable of being polymerized or crosslinked with a UV radiation or a heat. Such a liquid crystal compound is preferably a compound having a polymerizable group such as a (meth) acryloyl group, an epoxy group or a vinyl group, or a compound having a crosslinkable functional group such as an amino group or a hydroxyl group. Example of the compound includes a liquid crystal compound describe in WO 97/44703 showing a hybrid alignment, i.e. a liquid crystal compound which, when a layer of the liquid crystal compound is formed on a rubbed surface of a general alignment layer (such as an oriented polyimide membrane) previously subjected to a rubbing treatment, shows a planar alignment with a small tilt angle on the alignment layer side and an almost homeotropic alignment on the air interface side. An optically anisotropic substance obtained by polymerizing or crosslinking the above compound with a UV radiation or a heat in the presence of a polymerization initiator or a crosslinking agent while maintaining its oriented state, can maintain the constant oriented state thereafter under variations in temperature and the like.

According to the present invention, a liquid crystal compound may be directly applied onto a polymeric film subjected to an stretching treatment and an esterifying treatment, or onto a polymeric film subjected to an esterifying treatment followed by a rubbing treatment, to form a layer of the liquid crystal compound on the film when the compound can be separately applied to the film. However, a liquid crystal compound may also be applied in the form of a solution onto the film. A solvent contained in the solution to be used for applying a liquid crystal compound is not particularly limited as long as the solvent has a sufficient ability to dissolve the compound and the polymeric film has a good wettability by the solution applied to the film; it does not disturb the alignment of the dried liquid crystalline phase; and it does not disappear the effect brought about by the esterifying treatment applied to the polymeric film. Examples of the solvent include but are not limited to aromatic hydrocarbons such as toluene, xylene and the like; ethers such as anisole, dioxane, tetrahydrofuran and the like; ketones such as methyl isobutyl ketone, methyl ethyl ketone, cyclohexanone, cyclopentanone, 2-pentanone, 3-pentanone, 2-hexanone, 3-hexanone, 2-heptanone, 3-heptanone, 4-heptanone, 2,6-dimethyl-4-heptanone and the like; alcohols such as n-butanol, 2-butanol, cyclohexanol, isopropyl alcohol and the like; cellosolves such as methyl cellosolve, methyl acetate cellosolve and the like; and esters such as ethyl acetate, butyl acetate, methyl lactate and the like. The solvent may be used singly or in mixture. The concentration of the liquid crystal compound in the solution may be varied with the ability of the solvent to dissolve the compound, the wettability of the polymeric film by the solvent, the thickness of a layer of the applied liquid crystal compound and the like. It may be preferably, however, about 5 to 80% by weight, more preferably about 10 to 70% by weight. And, a leveling agent may be also added in order to improve the wettability of the polymeric film by the solution and the uniformity of the thickness of the obtained coat of the liquid crystal compound. The nature of the leveling agent is not particularly limited as long as it does not disturb the alignment of the liquid crystal.

The method of applying the liquid crystal compound onto an orientated polymeric film subjected to an esterifying treatment or onto a polymeric film subjected to an esterifying treatment followed by a rubbing treatment, is not particularly limited. However, it is preferably a method capable of applying the liquid crystal compound onto the film in uniform thickness, since the thickness of a liquid crystal compound layer obtained by applying the liquid crystal compound effects the retardation upon tilting the film. Examples of the method include a microgravure coating method, a gravure coating method, a wire bar coating method, a dip coating method, a spray coating method, a meniscus coating method and the like. The thickness of the liquid crystal compound layer may be varied with a desired value of retardation, which may be then also varied depending on the birefringence of the liquid crystal compound. The thickness is preferably about 0.05 to 20 $\mu$m, more preferably about 0.1 to 10 $\mu$m.

For example, the aligning method of the present invention may be a method of aligning a liquid crystal compound on a polymeric film comprising preparing a solution of the liquid crystal compound in view of the solubility and the wettability of the film; optionally adding a polymerization initiator and/or a crosslinking agent and/or a levelling agent to the solution as occasion demands; applying the solution onto the orientated polymeric film subjected to an esterifying treatment or onto the polymeric film subjected to an esterifying treatment followed by an rubbing treatment; drying the film by heating to align the liquid crystal compound; and then optionally polymerizing or crosslinking the liquid crystal compound with a UV radiation or a heat to fix the aligned state as occasion demands. Conditions under which the film is dried by heating, and conditions under which the the polymerization or cross-linking reaction using a UV radiation or a heat is conducted are suitably determined by those skilled in the art in view of the nature of a solvent to be used, and the stability of the aligned state of the liquid crystal compound and the change thereof to be caused by the variation in temperature.

The liquid crystal compound layer obtained according to the aligning method of the present invention in which the liquid crystal compound is aligned in a direction different from the stretching direction or the rubbing direction (for example, the compound being aligned almost perpendicularly to the surface of the orientated polymeric film or the surface of the rubbed polymeric film) can be used in an integrated form with the orientated polymeric film subjected to an esterifying treatment or the polymeric film subjected to an esterifying treatment followed by an rubbing treatment, to obtain an optical film comprising the polymeric film of the present invention. If the aligned liquid crystal compound layer can be peeled off from the polymeric film, it may be transferred and adhered to another film with a pressure-sensitive adhesive or an adhesive to obtain an optical film comprising the liquid crystal compound layer of the present invention.

As a specific example of the optical film comprising the orientated polymeric film of the present invention obtained by integrating the liquid crystal compound layer with the orientated polymeric film subjected to an esterifying treatment, when the orientated polymeric film is a retardation film, mention may be made of a retardation film which is prepared by directly forming a layer of the liquid crystal compound aligned in a certain direction on the retardation film, and which has retardation properties (such as a change in the retardation depending on a viewing angle) distinguishable from those of only the orientated polymeric film subjected to an esterifying treatment. When the orientated polymeric film is a film having a polarization property as set forth above, mention may be made of a polarizer having a layer of the liquid crystal compound directly formed on the polarizer in which the compound is aligned in a certain direction. In this case, a thinner polarizer can be prepared in a simpler process as compared with the prior process which comprises forming a layer of a liquid crystal compound on another film by aligning the compound on the film and then adhering the liquid crystal compound layer to a polarizer consisting of an orientated polymeric film interposed between triacetylcellulose films through a pressure sensitive adhesive or the like.

If the liquid crystal compound layer obtained according to the method of the present invention is aligned almost perpendicularly and has a positive uniaxiality against the thickness direction, a change in retardation associated with the tilt of an optical isomer having a negative uniaxiality against the thickness direction can be compensated. Therefore, the liquid crystal compound layer of the present invention can be applied to various optical elements. For example, by laminating a layer of the almost perpendicularly aligned liquid crystal compound on a film having a negative uniaxiality against the thickness direction such as a cholesteric liquid crystal film, a cholesteric liquid crystal film having an improved viewing angle property can be obtained as one embodiment of the optical film of the present invention. Further, by laminating this film on a ¼ wave plate, a non-absorption type polarizer having an improved dependency on viewing angle can be obtained as one embodiment of the optical film of the present invention. Further, by forming a layer of an almost perpendicularly aligned liquid crystal compound on a polarizer and laminating thereon a ¼ wave plate and then a cholesteric liquid crystal film, a polarizer providing a wide-viewing angle and a high-contrast can be obtained as one embodiment of the optical film of the present invention which has a very efficient utilization of a backlight and a usefulness for a liquid crystal display and the like. Further, a retardation film obtained by laminating a layer of an almost perpendicularly aligned liquid crystal compound on a monoaxially stretched retardation film is also one embodiment of the optical film of the present invention, which can show a change in retardation depending on the tilt (viewing angle) distinguishable from that of a monoaxially stretched retardation film.

A layer of a liquid crystal compound aligned in a certain direction peeled off the polymeric film is used, for example, when the relationship between a slow axis (or a fast axis) of the liquid crystal compound layer combined with any other retardation film and an optical axis of the liquid crystal compound layer may have effect on the optical properties of the resultant laminate. In such an embodiment, an optical film having the liquid crystal compound layer of the present invention can be obtained, for example, by adhering an orientated or rubbed polymeric film having the liquid crystal compound layer to a retardation film with an adhesive or the like in an arrangement such that the resultant laminate has a given optical axis, and then peeling the liquid crystal compound layer adhered to the retardation film from the orientated or rubbed polymeric film. In this connection, when the polymeric film peeled maintains its ability of aligning a liquid crystal compound, it can be reused.

An optical film obtained according to the present invention can be applied to various image display devices such as a liquid crystal display, a plasma display, an electroluminescence display and the like, to give an image display device of the present invention having improved properties including a viewing angle property, a contrast property, an anti-reflecting property and the like. When an optical film of the present invention is used in a liquid crystal display, a liquid crystal display device of the present invention can be obtained by arranging the optical film in order to obtain desired properties such that it interposes a liquid crystal cell or is positioned at one of the back light side and the observer side. In particular, using an optical film of the present invention integrated with a polarizer makes it possible to provide a thinner display device and a simpler manufacturing process as compared with a prior process comprising adhering a polarizer consisting of an orientated polymeric film interposed between triacetylcellulose films to another film comprising a liquid crystal compound layer.

EXAMPLES

The following examples illustrate the present invention in more detail.

Example 1

A polyvinyl alcohol film having a thickness of 75 μm and a polymerization degree of 2400 was monoaxially stretched fivefold in an aqueous 3% boric acid solution at 50° C. While maintaining the stretched state, the film was washed with water and dried to give an orientated polymeric film treated with boric acid ($H_3BO_3$) having a thickness of about 20 μm. The film contained 13.5% of boric acid in the polyvinyl alcohol.

Separately, 23.5 parts by weight of a liquid crystal compound represented by the following formula:

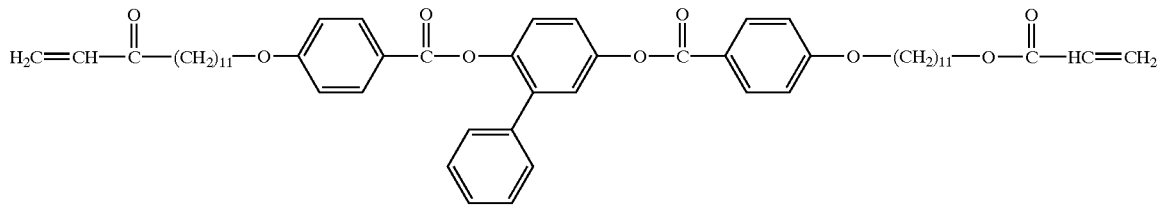

70.5 parts by weight of a liquid crystal compound represented by the following formula:

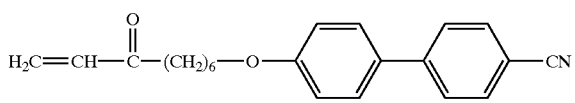

(a mixture of the above liquid crystal compounds being a UV curable liquid crystal compound showing a hybrid alignment described in WO97/44703 which, when a layer of the liquid crystal compound is formed on a rubbed surface of a general alignment layer such as polyimide membrane previously subjected to a rubbing treatment, shows a nematic liquid crystal phase such that the compound is aligned in a planar alignment with a minor tilt angle on the side contacting with the alignment layer and is aligned in an almost homeotropic alignment on the side constituting an air interface and 6 parts by weight of IRGACURE 907 (a photopolylnerization initiator manufactured by Ciba Geiby Co.) where dissolved in a mixed solvent comprising 130 parts by weight of toluene and 55.7 parts by weight of cyclohexanone to prepare a solution with a solid concentration of 35%. A liquid crystal compound layer of the present invention was formed by applying the resultant solution with a wire bar onto the orientated polyvinyl alcohol film adhered to a glass plate with a pressure sensitive adhesive such that a dried film had a thickness of about 1 μm; heating the film to remove the solvent; and then polymerizing the liquid crystal compound by an irradiation with a high pressure mercury lamp (80 W/cm). Next, the thus obtained liquid crystal compound layer was transferred to a triacetylcellulose film coated with a pressure sensitive adhesive to obtain an optical film having the liquid crystal compound layer of the present invention.

The optical film was determined for a change in retardation using an automatic birefringence analyzer (KOBRA-21AD manufactured by OJi Scientific Instruments) when it was tilted from a direction perpendicular to the surface of the orientated polyvinyl alcohol film before the transfer to the stretching direction and to a direction orthogonal to the stretching direction. Results are shown in FIG. 1. Likewise, a film obtained by transferring the only liquid crystal compound layer to a glass plate coated with an adhesive was also determined for a change in retardation using an automatic birefringence analyzer (KOBRA-21AD manufactured by Oji Scientific Instruments) when it was tilted from a direction perpendicular to the surface of the film. Results are shown in FIG. 2.

Example 2

A liquid crystal compound layer of the present invention was formed in the same manner as described in Example 1, provided that an iodine-type polarizer manufactured by POLATECHNO (polymerization degree being 1700; thickness after stretching being about 20 μm; content of boric acid ($H_3BO_3$) in polyvinyl alcohol being about 15%; a saponified triacetylcellulose film being adhered to one surface of the plate with a polyvinyl alcohol adhesive) is used. The resultant liquid crystal compound layer was determined for a change in retardation depending on the viewing angle in the same manner as described in Example 1.

Results are shown in FIG. 3. Likewise, a film obtained by transferring the only liquid crystal compound layer to a glass plate coated with an adhesive was also determined for a change in retardation depending on the viewing angle in the same manner as described in Example 1. Results are shown in FIG. 4.

Example 3

An aqueous 1% polyvinyl alcohol (GOSENOL NH26 manufactured by Nippon Synthetic Chemical Ind.) solution was applied onto a saponified triacetylcellulose film and dried at 70° C. Next, an aqueous 0.1% boric acid ($H_3BO_3$) solution was applied to the polyvinyl alcohol membrane laminated on the triacetylcellulose film and dried at 70° C. Further, a polyvinyl alcohol membrane surface of the triacetylcellulose film comprising the boric acid-treated polyvinyl alcohol membrane laminated thereon was subjected to a rubbing treatment using a rubbing roll (diameter: 50 mm) wound with a rayon rubbing cloth (YA-20-R manufactured by YOSHIKAWA KAKO k.k.) under the following conditions. Number of revolution of the rubbing roll: 200 m/min; Contact length with the triacetylcellulose film having the polyvinyl alcohol membrane treated with boric acid: 3 mm; Conveying speed of the film: 1 m/min.

A mixture of liquid crystal compounds used in Example 1 comprising 23.5 parts by weight of the compound represented by the formula:

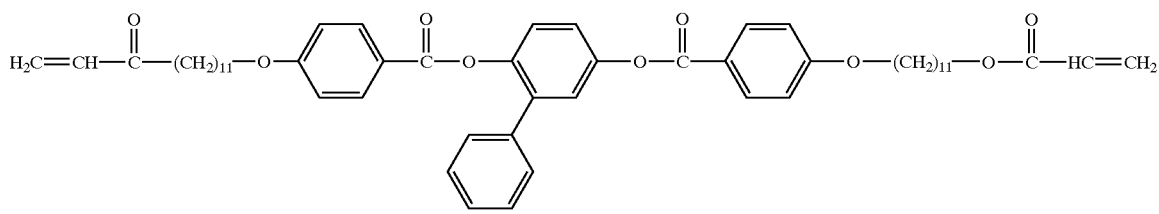

and 70.5 parts by weight of the compound represented by the formula:

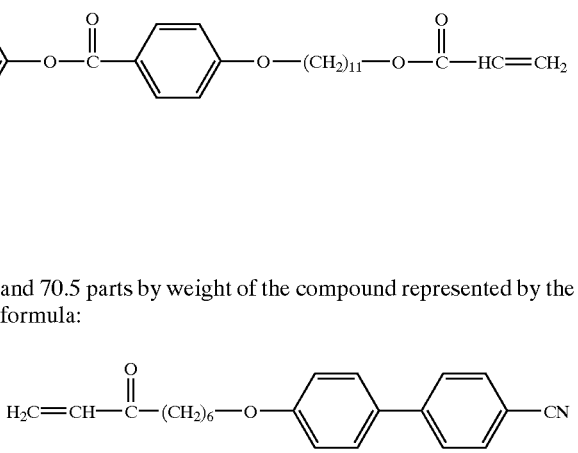

and 6 parts by weight of IRGACURE 907 (a photopolymerization initiator manufactured by Ciba Geiby Co.) were dissolved in a mixed solvent comprising 130 parts by weight of toluene and 55.7 parts by weight of cyclohexanone to prepare a solution with a solid concentration of 35%. An optical film comprising a liquid crystal Compound layer of the present invention was formed by applying the resultant solution with a wire bar onto the rubbed polyvinyl alcohol membrane surface of the triacetylcellulose film having the polyvinyl alcohol membrane treated with boric acid and subjected to a rubbina treatment such that a dried film had a thickness of about 1 μm heating the film to remove the solvent; and then polymerizing the liquid crystal compound by an irradiation with a high pressure mercury lamp (80 W/cm). The optical film was determined for a change in retardation using an automatic birefringece analyzer (KOBRA-21AD manufactured by OJi Scientific Instruments) when it was tilted from a direction perpendicular to the surface of the triacetylcellulose film having the polyvinyl alcohol membrane before the transfer to the rubbing direction and to a direction orthogonal to the rubbing direction. Results are shown in FIG. 5. Likewise, a film obtained by transferring the only liquid crystal compound layer to a glass plate coated with an adhesive was also determined for a change in retardation when it was tilted from a direction perpendicular to the surface of the film in the same manner as described in Example 1. Results are shown in FIG. 6.

Comparative Example

In the same manner as described in Example 3 with the exception that no aqueous 0.1% boric acid ($H_3BO_3$) solution was used, a polyvinyl alcohol film surface of the triacetylcellulose film comprising the polyvinyl alcohol film laminated thereon was subjected to a rubbing treatment, and a liquid crystal compound layer was then formed. The thus obtained liquid crystal compound layer was determined for a change in retardation depending on the viewing angle in the same manner as described in Example 3. Results are shown in FIG. 7. Likewise, a film obtained by transferring the only liquid crystal compound layer to a glass plate coated with an adhesive was also determined for a change in retardation when it was tilted from a direction perpendicular to the surface of the film in the same manner as described in Example 1. Results are shown in FIG. 8.

It is clear from Examples 1 and 2 that the whole of the liquid crystal compound layer obtained according to the aligning method of the present invention is aligned in a direction different from the stretching direction and almost perpendicular to the film surface (homeotropic alignment), although the orientated polymeric film is used. Further, it is also clear from Example 3 and Comparative Example that the whole of the liquid crystal compound layer obtained according to the aligning method of the present invention is aligned in a direction different from the rubbing direction and almost perpendicular to the surface of the film (homeotropic alignment).

EFFECT OF THE INVENTION

Utilizing the present method of aligning a liquid crystal compound characterized in that the method comprises subjecting a polymeric film having hydroxyl groups to a) a stretching treatment and an esterifying treatment, or b) an esterifying treatment followed by a rubbing treatment; and then forming a layer of the liquid crystal compound on the film, so that the liquid crystal compound is aligned in a direction different from the stretching direction in case of a), or the liquid crystal compound is aligned in a direction almost perpendicular to the surface of the rubbed film in case of b), a liquid crystal compound layer useful in various optical elements and an optical film comprising the layer can be made wherein the liquid crystal compound is aligned in a direction different from the stretching direction or almost perpendicular to the polymeric film surface subjected to a rubbing treatment.

Figure 1:
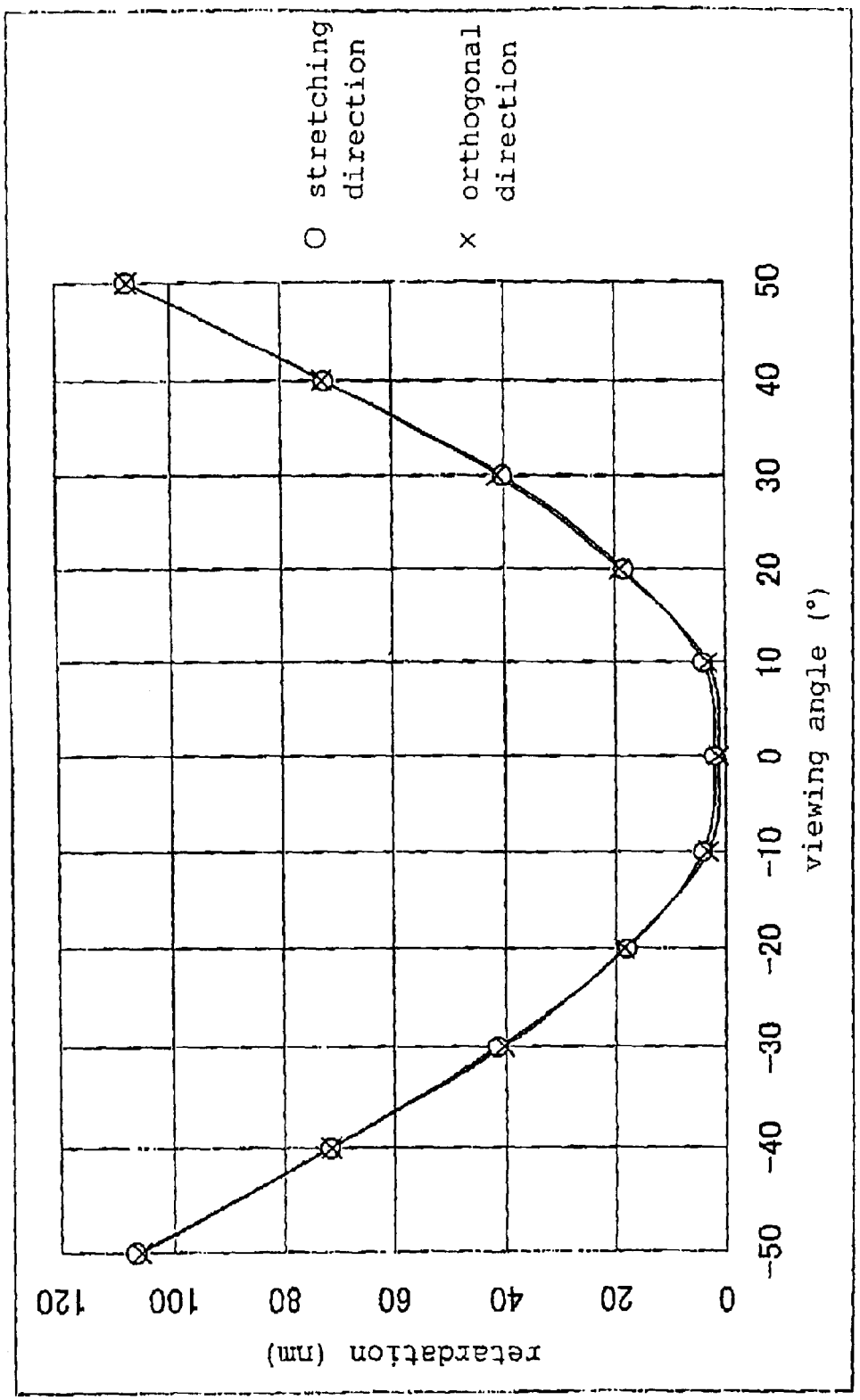
FIG. 1 shows a change in retardation depending on the viewing angle of the liquid crystal compound layer obtained in Example 1 according to the present invention.
Figure 2:
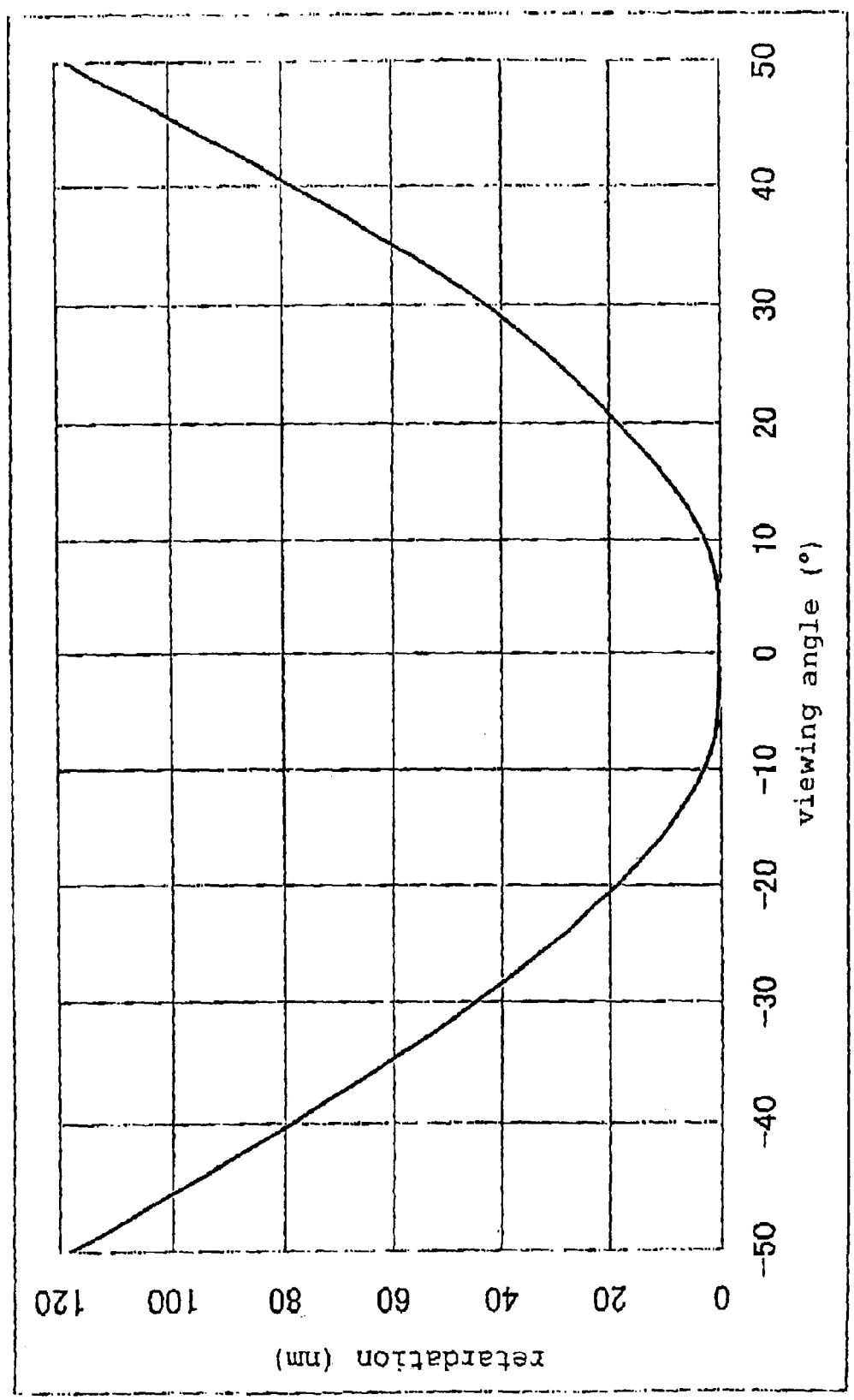
FIG. 2 shows a change in retardation depending on the viewing angle of the liquid crystal compound layer obtained in Example 1 according to the present invention when the layer is transferred to a glass plate coated with an adhesive.
Figure 3:
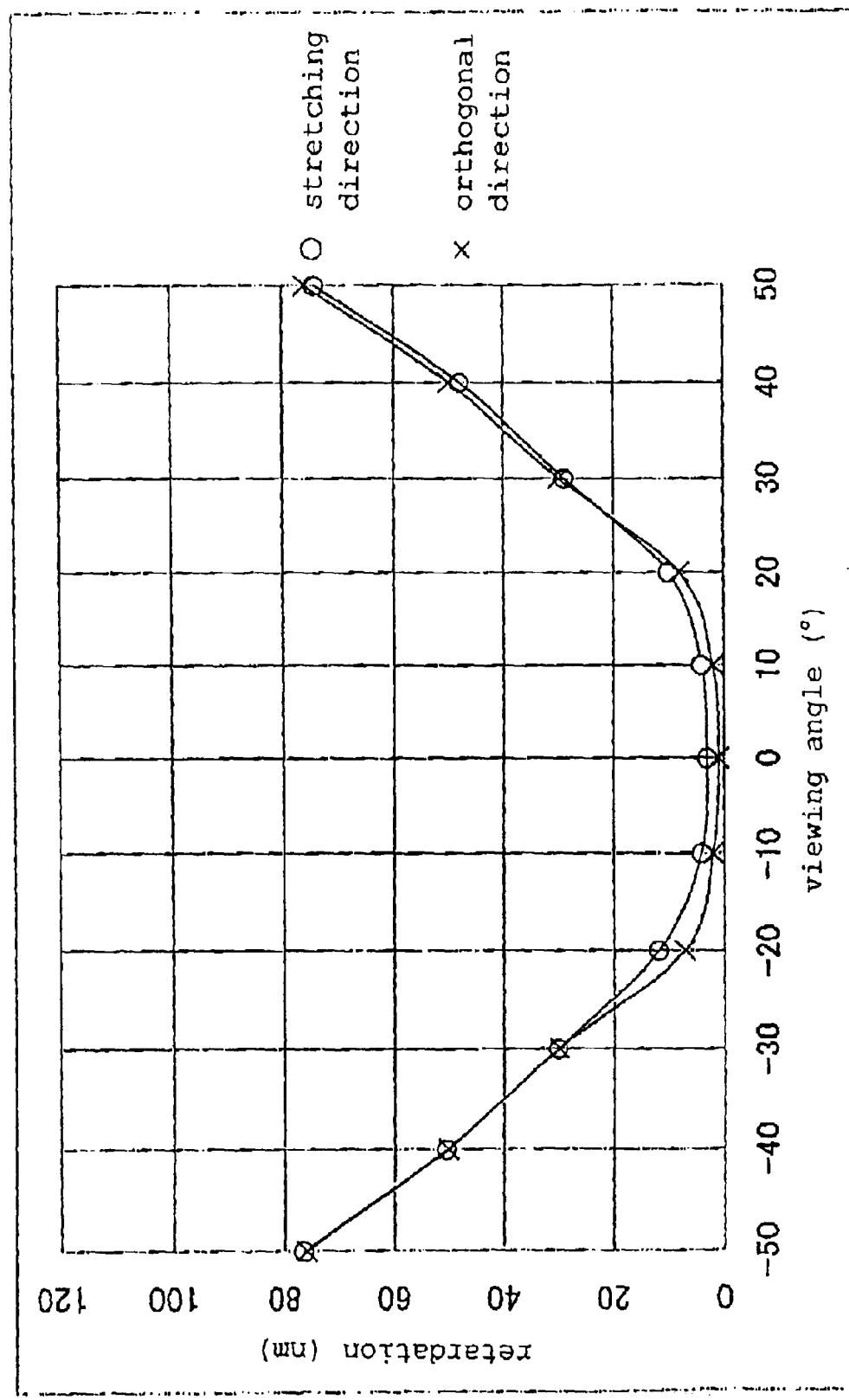
FIG. 3 shows a change in retardation depending on the viewing angle of the liquid crystal compound layer obtained in Example 2 according to the present invention.
Figure 4:
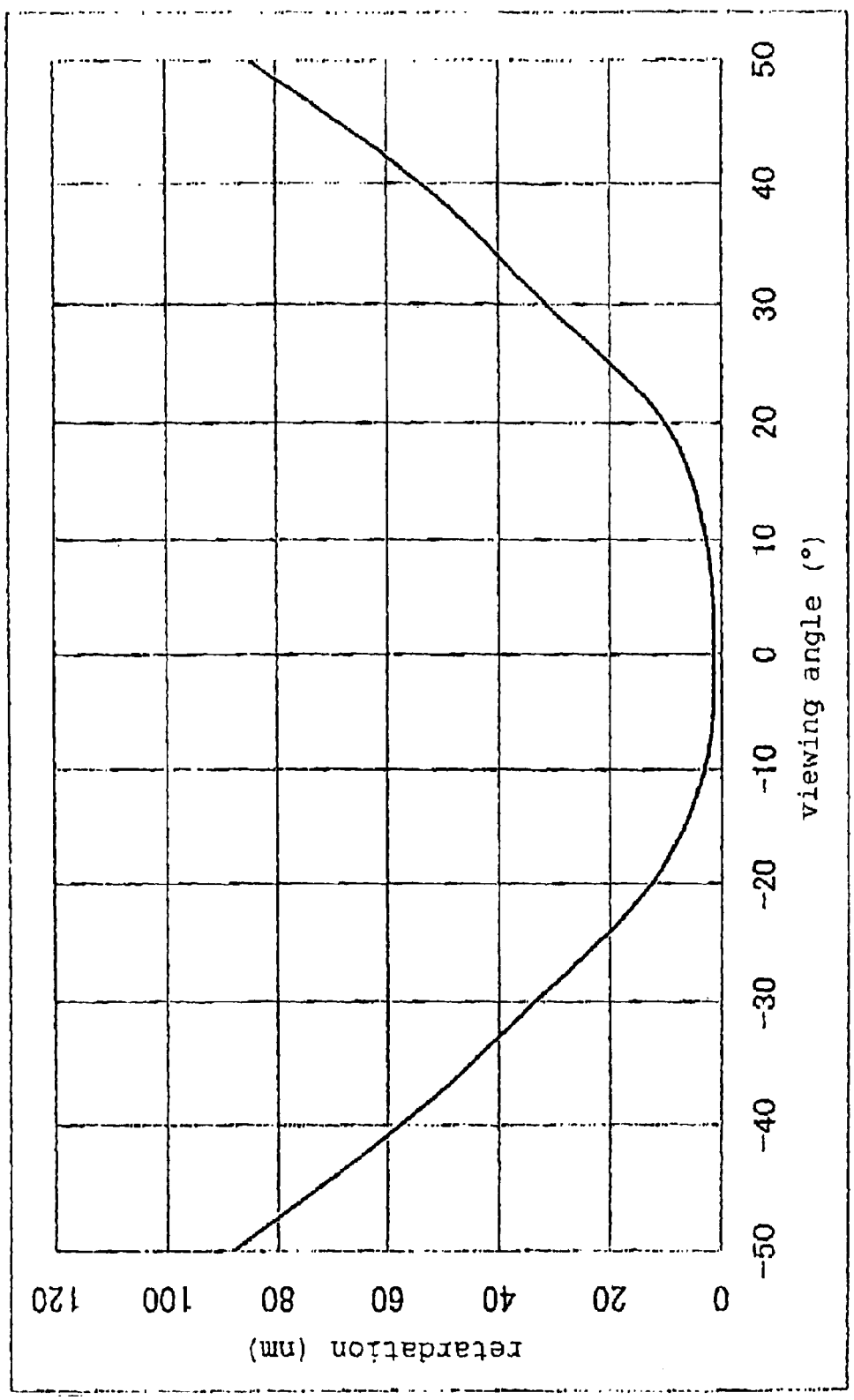
FIG. 4 shows a change in retardation depending on the viewing angle of the liquid crystal compound layer obtained in Example 2 according to the present invention when the layer is transferred to a glass plate coated with an adhesive.
Figure 5:
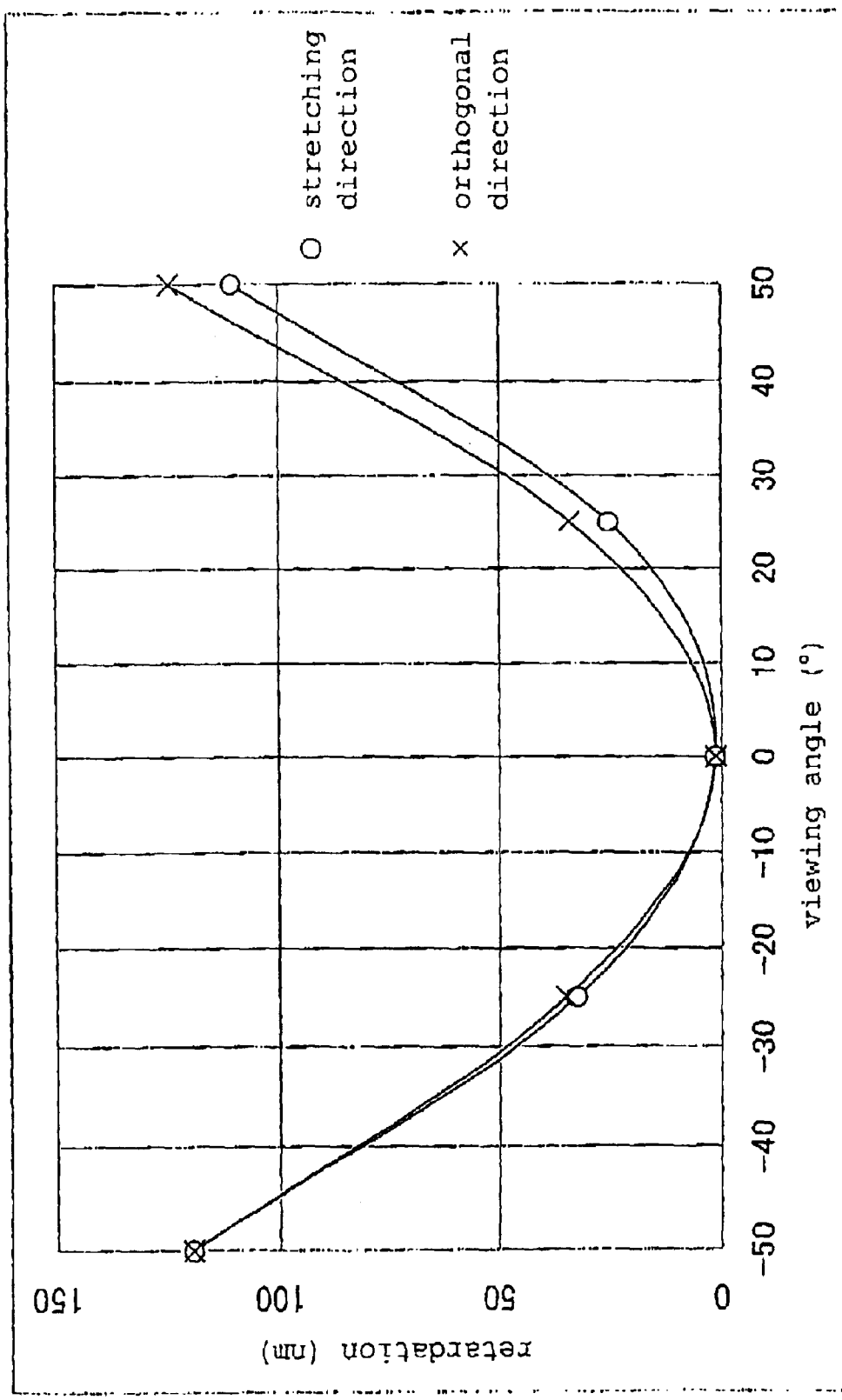
FIG. 5 shows a change in retardation depending on the viewing angle of the liquid crystal compound layer obtained in Example 3 according to the present invention.
Figure 6:
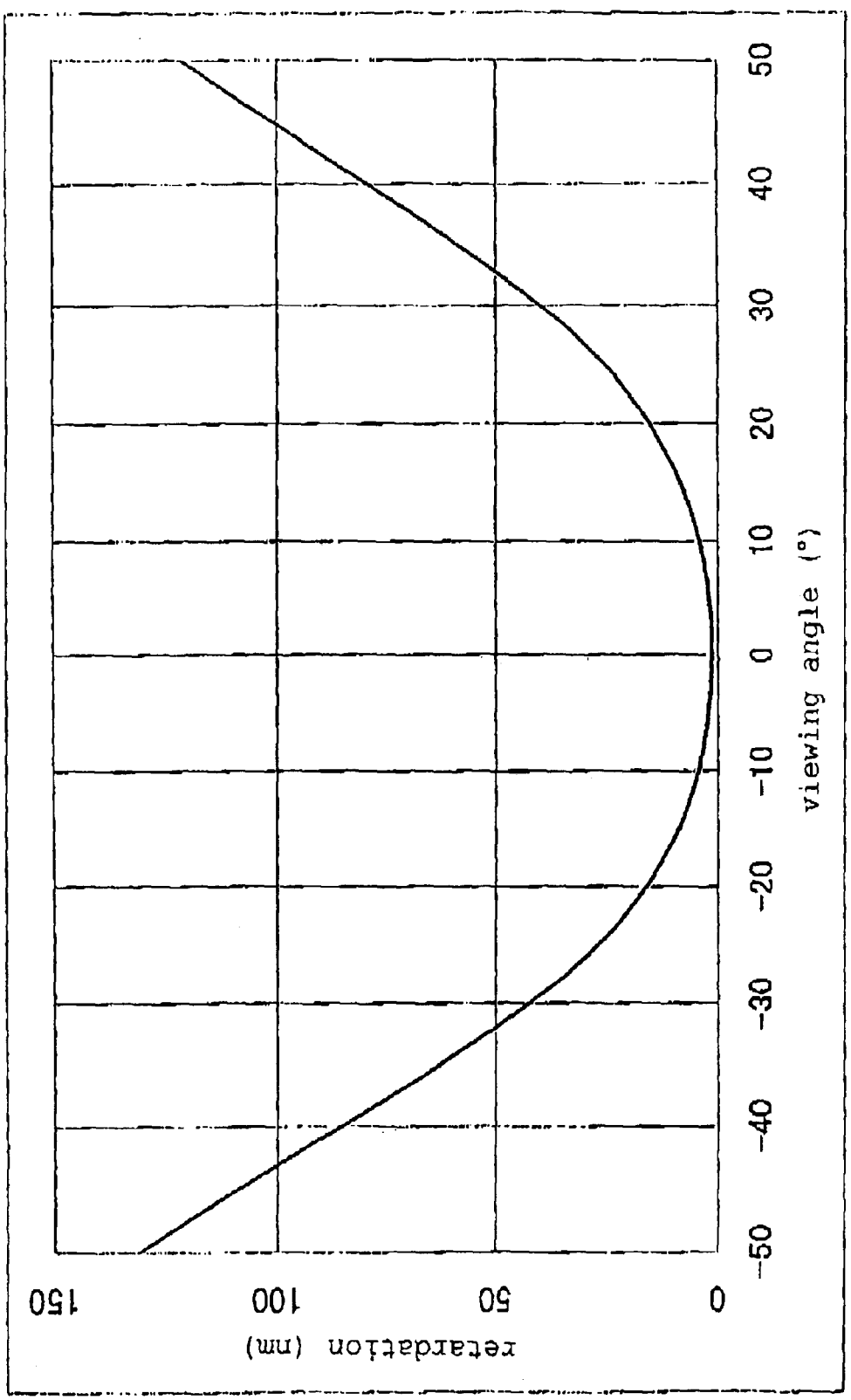
FIG. 6 shows a change in retardation depending on the viewing angle of the liquid crystal compound layer obtained in Example 3 according to the present invention when the layer is transferred to a glass plate coated with an adhesive.
Figure 7:
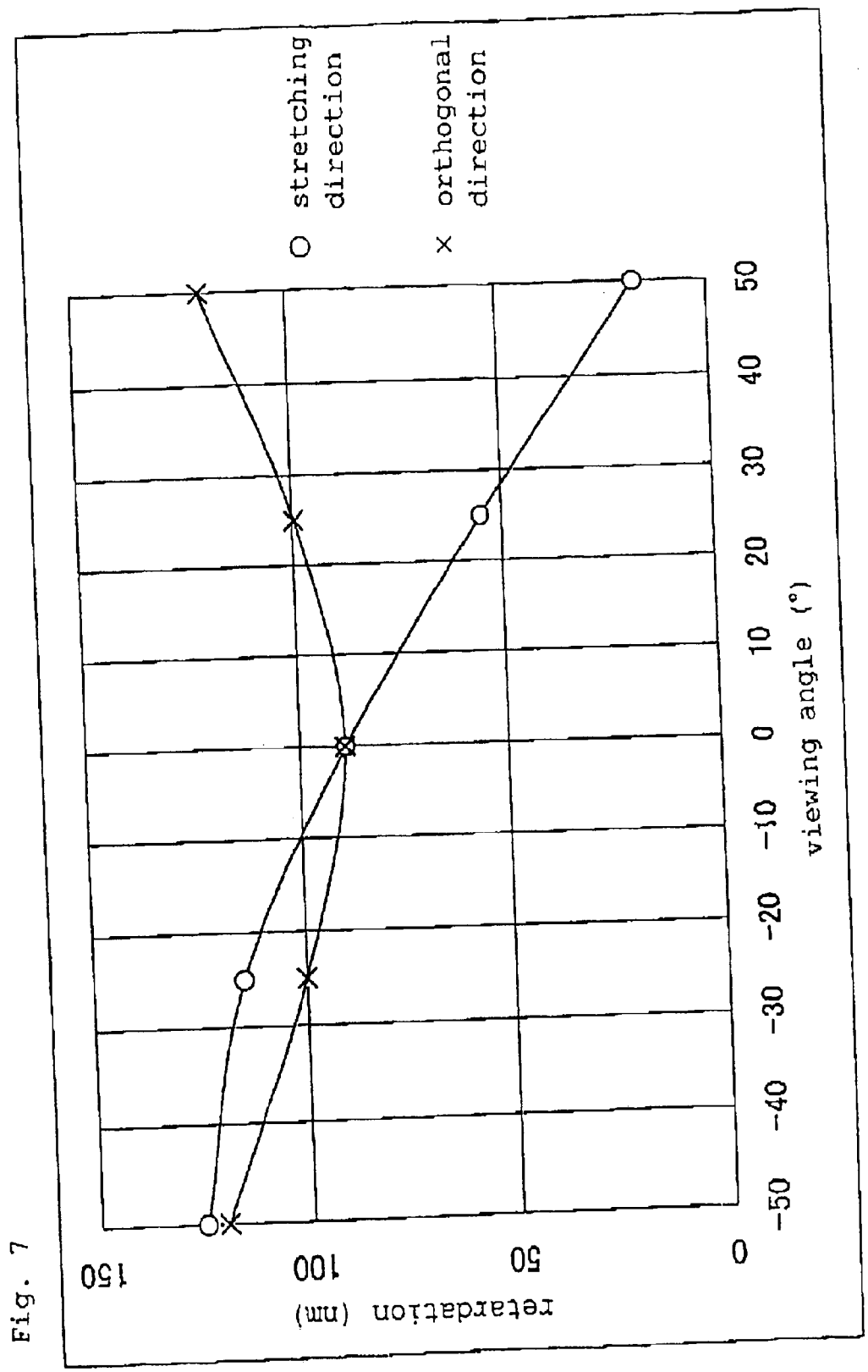
FIG. 7 shows a change in retardation depending on the viewing angle of the liquid crystal compound layer obtained in Comparative Example.
Figure 8:
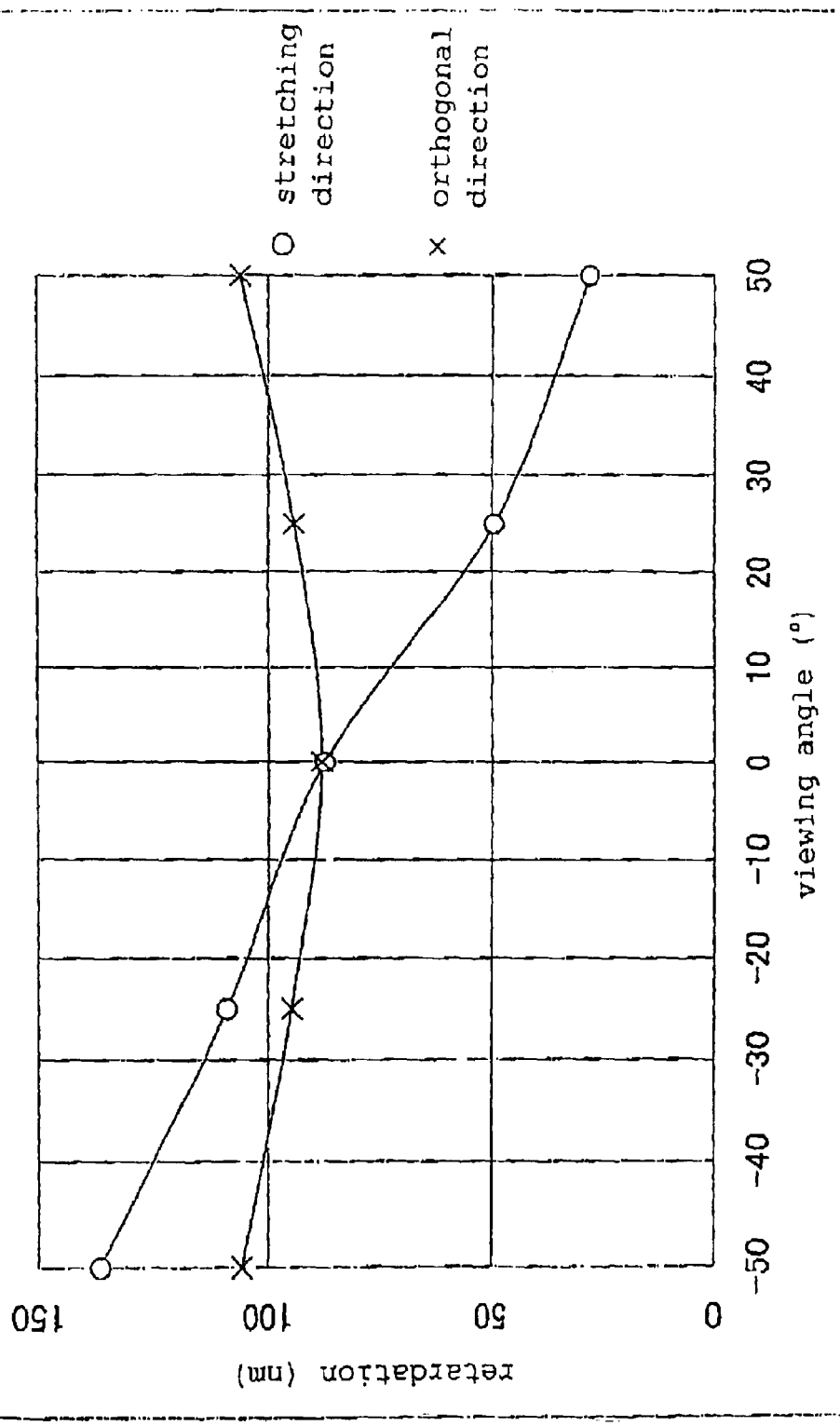
FIG. 8 shows a change in retardation depending on the viewing angle of the liquid crystal compound layer obtained in Comparative Example when the layer is transferred to a glass plate coated with an adhesive.

What is claimed is:

1. A method of preparing a liquid crystal layer characterized in that the method comprises subjecting a polymeric film having hydroxyl groups to a) a stretching treatment and an esterifying treatment with a boric acid compound or b) an esterifying treatment with the boric acid compound followed by a rubbing treatment; and then forming a layer of a liquid crystal compound on the film, so that the liquid crystal compound is aligned in a direction almost perpendicular to the surface of the film.

2. The method of preparing a liquid crystal layer as claimed in claim 1, wherein the boric acid compound is ortho-boric acid.

3. The method of preparing a liquid crystal layer as claimed in claim 2, wherein the polymeric film having hydroxyl groups is a film of polyvinyl alcohol or its derivative.

4. The method of preparing a liquid crystal layer as claimed in claim 3, wherein the polymeric film subjected to a stretching treatment and an esterifying treatment has a polarization property.

5. The method of preparing a liquid crystal layer as claimed in claim 3, wherein the method of forming the layer of the liquid crystal compound is a method comprising applying a solution of the compound onto said a) a polymeric film subjected to a stretching treatment and an esterifying treatment with a boric acid compound or b) a polymeric film subjected to an esterifying treatment with the boring acid compound followed by a rubbing treatment, and then drying the coated film.

6. The method of preparing a liquid crystal layer as claimed in claim 1 or 2 wherein the liquid crystal compound is a thermotropic liquid crystal or a lyotropic liquid crystal.

7. The method of preparing a liquid crystal layer as claimed in claim 6, wherein the liquid crystal compound is a compound showing a nematic phase in a liquid crystal state.

8. The method of preparing a liquid crystal layer as claimed in claim 7, wherein the liquid crystal compound is a UV curable or thermosetting liquid crystal compound.

* * * * *